(12) United States Patent
Maeda

(10) Patent No.: US 6,922,032 B2
(45) Date of Patent: Jul. 26, 2005

(54) ELECTRIC MOTOR CONTROL DEVICE

(75) Inventor: Norihiro Maeda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/765,302

(22) Filed: Jan. 27, 2004

(65) Prior Publication Data

US 2004/0183490 A1 Sep. 23, 2004

(30) Foreign Application Priority Data

Jan. 27, 2003 (JP) ....................................... 2003-017323

(51) Int. Cl.⁷ ............................................... H02P 3/12
(52) U.S. Cl. ........................ 318/373; 318/362; 318/286; 318/375
(58) Field of Search ................................. 318/360–363, 318/370–375; 369/50, 53; 360/74.1

(56) References Cited

U.S. PATENT DOCUMENTS

| | | | | |
|---|---|---|---|---|
| 4,544,868 A | * | 10/1985 | Murty | 318/254 |
| 4,677,356 A | * | 6/1987 | Tsuneda et al. | 318/258 |
| 4,687,975 A | * | 8/1987 | Suzuki | 318/261 |
| 4,926,101 A | * | 5/1990 | Enomoto et al. | 318/374 |
| 4,954,863 A | * | 9/1990 | Harada et al. | 355/51 |
| 5,239,331 A | * | 8/1993 | Kobe et al. | 396/135 |
| 5,471,122 A | * | 11/1995 | Bilotti et al. | 318/284 |
| 5,715,157 A | * | 2/1998 | Kuhn | 369/47.42 |
| 5,982,119 A | * | 11/1999 | Okada et al. | 318/286 |
| 6,160,368 A | * | 12/2000 | Plutowski | 318/375 |
| 6,531,839 B1 | * | 3/2003 | Shin et al. | 318/371 |
| 6,831,432 B2 | * | 12/2004 | Murakami | 318/362 |
| 2003/0102833 A1 | * | 6/2003 | Murakami | 318/362 |

FOREIGN PATENT DOCUMENTS

| | | |
|---|---|---|
| JP | 8-275571 | 10/1996 |
| JP | 10-98894 | 4/1998 |

* cited by examiner

Primary Examiner—Paul Ip
(74) Attorney, Agent, or Firm—Merchant & Gould P.C.

(57) ABSTRACT

In the driving operation of a sensorless three-phase motor to be used in a rotation at a comparatively low speed (approximately 2000 RPM or less) and to be bipolar driven, the number of rotations and a rotating position are accurately detected from an induced voltage and a reverse rotation brake is applied in an accurate phase, and furthermore, a short brake is applied at a set rotation number signal or less also in braking. Consequently, it is possible to prevent phase switching from being carried out in an erroneous timing and to prevent a rotation in a reverse direction by an inertia.

1 Claim, 3 Drawing Sheets

ELECTRIC MOTOR CONTROL DEVICE

BACKGROUND OF THE INVENTION

1. Field of the Invention

The present invention relates to a control device of an electric motor to be rotated at a comparatively low speed which is to be used in a disk device such as a CD or a DVD, and more particularly to a control device of an electric motor which accurately detects a rotating position and the number of rotations and carries out braking from a rotating state to a stop state promptly and accurately.

2. Description of the Related Art

Conventionally, as the methods known for stopping a three-phase motor having a driving winding for each phase being provided in a stator in a rotation state, there are so-called a short braking method where a full driving winding is short-circuited, and also known is so-called a reverse rotation braking method where a conduction state to each phase driving winding of an electric motor is made in a different state from a normal driving state such as to subject a driving winding in a conduction state under a period so as to generate a back electromotive force by which more than a source voltage can be applied for carrying out the braking.

More specifically, as for a method used for braking an electric motor having a comparatively low rotating speed, it is the reverse rotation braking method that is used because it is capable of carrying out an effective braking from a normal rotation state to a stop state.

However, since a high-speed rotation of a disk (for example, 10,000 RPM) has recently been introduced into the market, reflecting a demand for the high-speed write/read of data into/from the disk, the applicability of the reverse rotation braking method comes to b limited for its use. This is because in the case in which the reverse rotation braking method is used for braking the electric motor to carry out the high-speed rotation, the amplitude of the back electromotive voltage of the driving winding is necessarily increased to be more than a source voltage. As a result, the insulation intensity of the electric motor is required to be increased or a power loss problem which leads to heat generation cannot be any more disregarded.

In order to resolve such a situation, Japanese unexamined patent publication JP hei 10-98894 discloses such a method that the rotating speed signal of the three-phase motor to be unipolar-driven is compared with a predetermined rotation number threshold, in case of so-called a high-speed rotation area in which the rotating speed signal is higher than the threshold signal, one of the ends of a full driving winding is grounded to apply a short braking method, while in case of being in so-called a low-speed rotation area in which the rotating speed signal is smaller than the threshold value, a braking method is switched from a short brake to a reverse rotation brake. In this way, an electric motor to carry out a high-speed rotation can be braked.

Moreover, JP hei 8-275571 discloses the driving operation of a single-phase motor to be stopped which switches a conducting direction to a driving winding to carry out a rotation in response to the position detecting signal of a rotating sensor (a Hall element). In this case, the conducting direction is switched to carry out a reverse rotation, meanwhile, if the rotating sensor detects motor speed in that a predetermined number of rotations is obtained, then the switching operation is stopped, and the conducting direction to the driving winding is fixed to one direction whereby the stop operation can be carried out.

While switching to a reverse rotation brake is carried out in a low-speed rotation area in the conventional Patent Document 1, however, the reverse rotation braking method controls a phase switching timing by detecting the rotating position of the electric motor. More specifically, a sensorless motor detects a rotating position thereof according to a change in the polarity of an induced voltage where the phase is switched in the detected timing. However, when the number of rotations of the electric motor is decreased, the induced voltage is reduced. Consequently, the phase switching timing might be likely to be detected erroneously. Thus, there is a possibility that the switching might be carried out in an erroneous timing. Moreover, there is also a problem in that the rotation is carried out in a reverse direction by an inertia so that unpredictable induced voltage is further detected by a reverse rotation that is being kept by said inertia. These problems make the electric motor out of a control. This situation also brings about such a practical problem that replacing a disk in an audio apparatus immediately after a stop operation might damage the operator's fingers and it is not visually good to see the disk still continuing its turning. Further, this sometimes brings about a problem for the need of replaying being carried out immediately thereafter.

In said JP hei 10-98894, moreover, the middle potential of a Y connection fluctuates in case of bipolar driving in which a power is supplied to two of driving windings having a three-phase Y connection at the same time in positive and negative directions. Therefore, the induced voltage having each phase cannot be detected accurately. For this reason, the method in the Document 1 cannot be applied.

In the conventional method according to said JP hei 8-275571, moreover, the conducting direction to the driving winding is fixed to one direction when a brake is applied to a single-phase motor. In addition, there is also a problem in that a Hall device for detecting a rotating position is requited.

SUMMARY OF THE INVENTION

Therefore, it is an object of the invention to detect the number of rotations and a rotating position from an induced voltage also at time of braking in the driving operation of an electric motor to be used in a disk device and to apply a short brake at a predetermined number of rotations or less, thereby stopping the rotation of the electric motor quickly and accurately.

A first aspect of the invention is directed to a control device of an electric motor for driving the electric motor having multi-phase windings in response to output signals having a predetermined phase difference from each other, comprising a plurality of comparing means for comparing a terminal potential of each of the multi-phase windings with a middle potential of the multi-phase windings, driving timing signal generating means for generating a timing signal for outputting each of the output signals based on a result of the comparison carried out by each of the comparing means, and rotation number detecting means for detecting the number of rotations of the electric motor based on the result of the comparison obtained by the comparing means, wherein when the rotation of the electric motor is to be stopped, the driving timing signal generating means is controlled to apply a reverse rotation brake until the number of rotations of the electric motor is reduced to be a predetermined number of rotations by the rotation number detecting means, and the driving timing signal generating means is then controlled to apply a short brake until the rotation of the electric motor is stopped.

DESCRIPTION OF THE PREFERRED EMBODIMENTS

Figure 1:
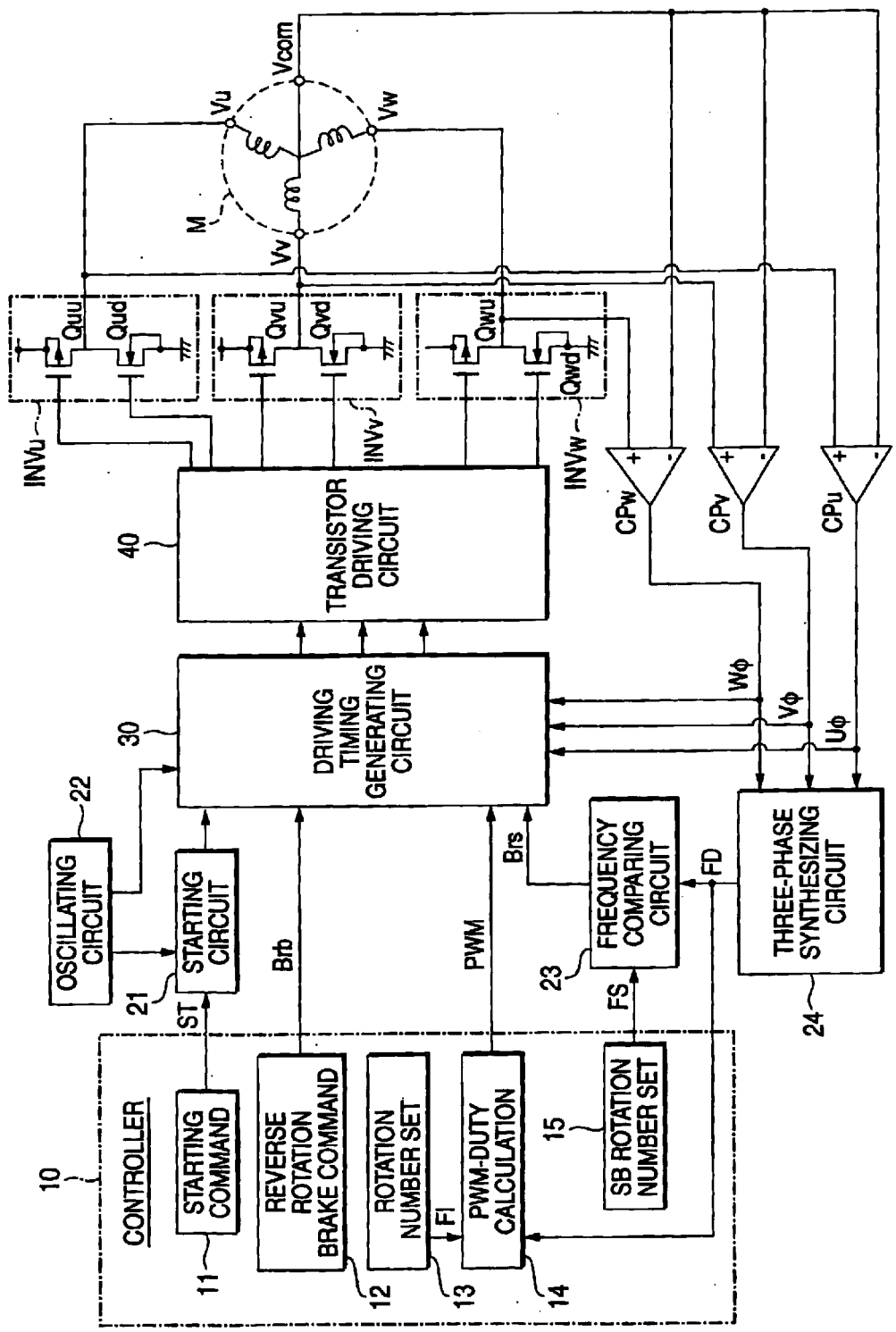
FIG. 1 is a diagram showing a circuit structure according to an embodiment of the invention.
Figure 2:
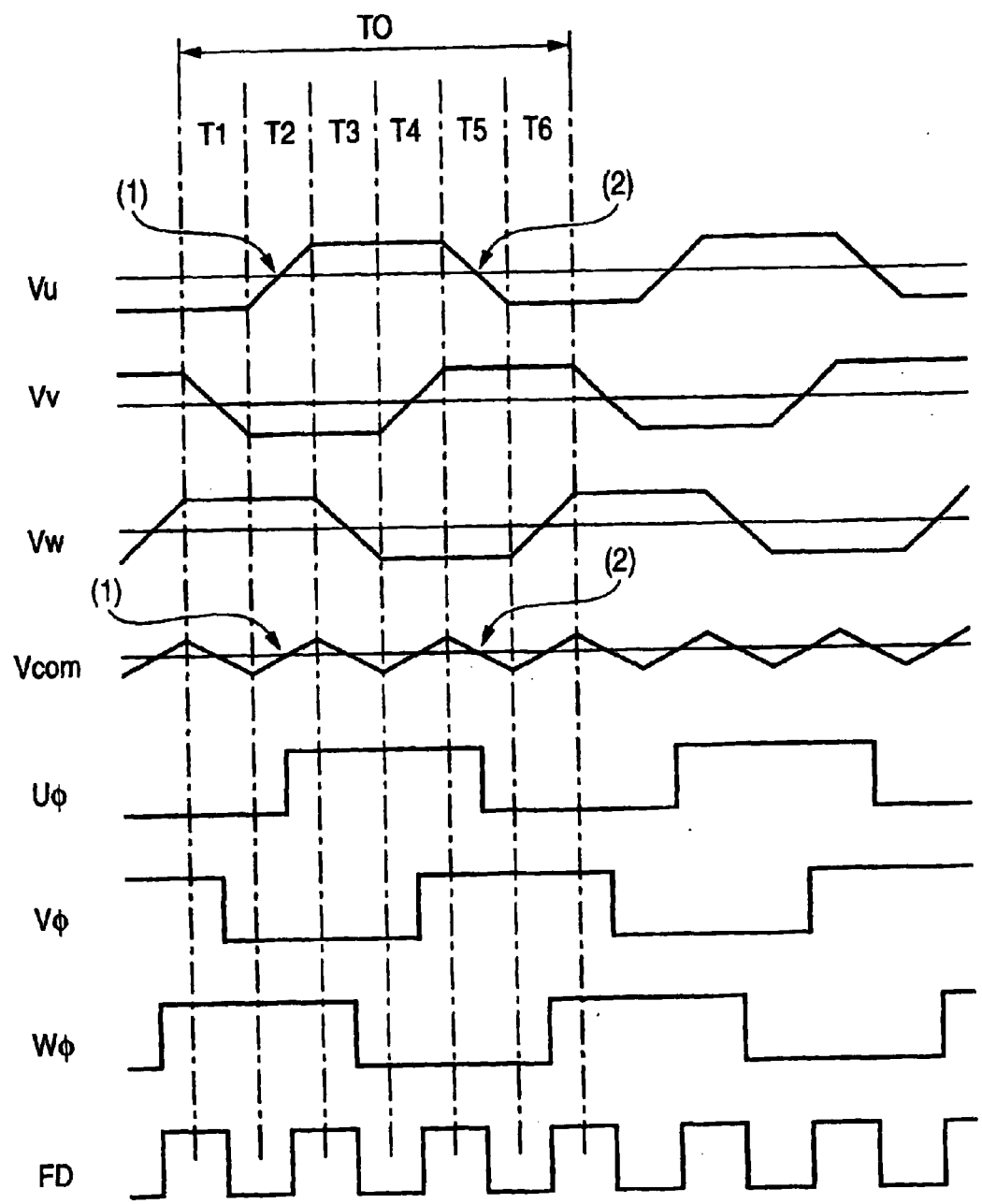
FIG. 2 is a timing chart showing a normal driving operation in FIG. 1.
Figure 3:
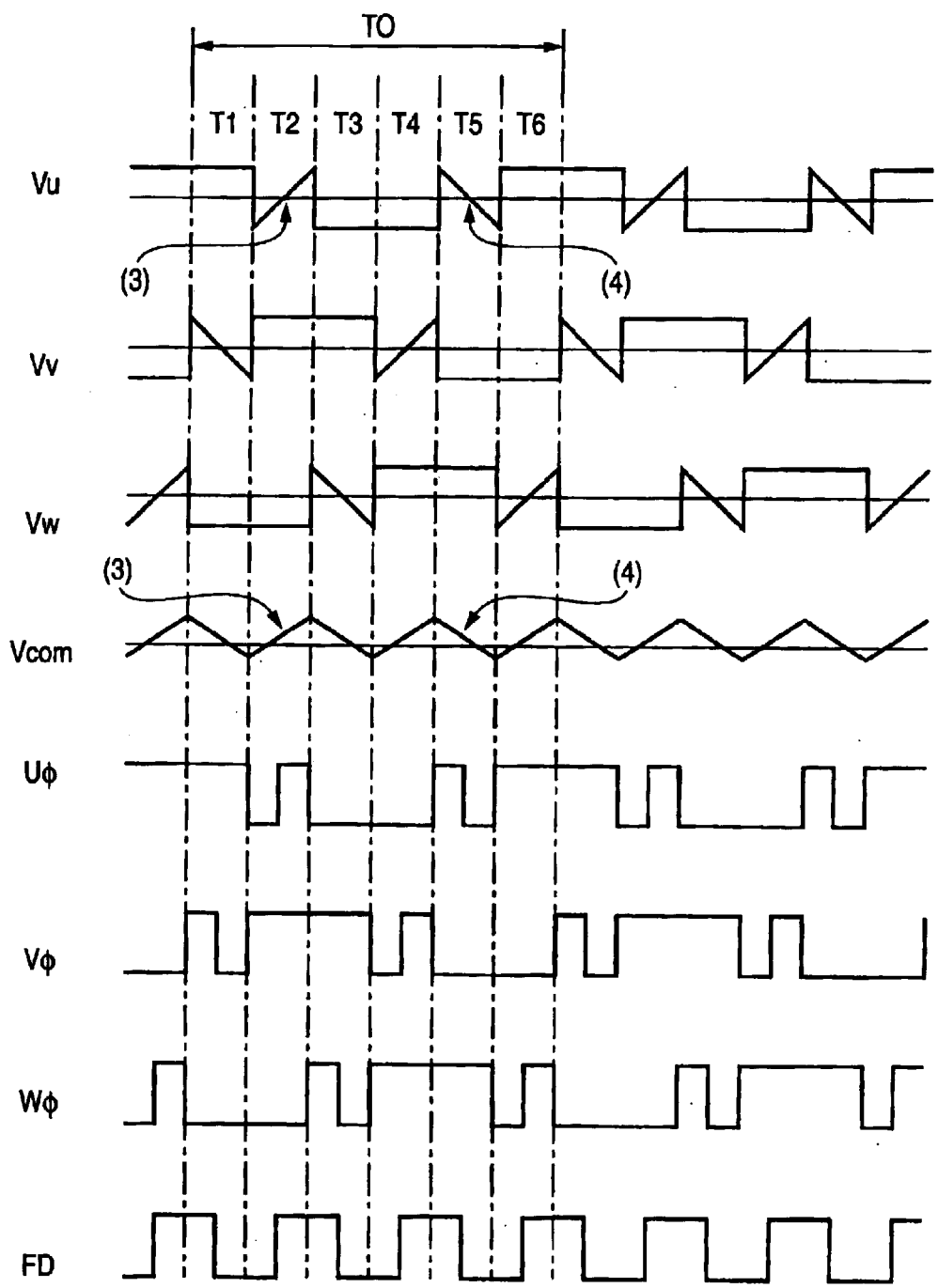
FIG. 3 is a timing chart showing a reverse rotation braking operation in FIG. 1.

An embodiment of a control device of a sensorless motor according to the invention will be described below with reference to FIGS. 1 to 3. FIG. 1 is a diagram showing a circuit structure according to the embodiment of the invention, FIG. 2 is a timing chart showing a normal driving operation, and FIG. 3 is a timing chart showing a reverse rotation braking operation.

In FIG. 1, a three-phase sensorless motor M has driving windings having U, V and W phases which are connected to be star-shaped (Y-type), and is provided with driving winding terminals and a Y connection middle terminal which Y connects them. The driving winding terminals are connected to the output terminals of inverters INVu, INVv and INVw, respectively.

The U-phase inverter INVu has an upper transistor Quu and a lower transistor Qud connected in series between a power source and a ground, and a node is connected to a U-phase driving winding terminal. The node has a U-phase node potential Vu.

The V-phase inverter INVv and the W-phase inverter INVw are also constituted in the same manner as the U-phase inverter INVu, and are connected respectively as shown in the drawing. In these inverters INVu, INVv and INVw, upper transistors Quu to Qwu are constituted by P-type MOS transistors and lower transistors Qud to Qwd are constituted by N-type MOS transistors. However, the upper and lower transistors may be constituted by the N-type MOS transistors or a bipolar transistor may be used.

In these inverters INVu, INVv and INVw, the upper and lower transistors Quu to Qwd are controlled by a conducting logic signal sent from a transistor driving circuit 40 in such a manner that a conduction to the sensorless motor M at 120 degrees is carried out by bipolar driving with a phase difference of 120 degrees among the three phases.

AU-phase comparator CPu compares the U-phase node potential Vu with a middle potential Vcom of the Y connection middle terminal, and outputs a U-phase synchronous timing signal Uφ which is synchronous with a phase switching timing. Similarly, a V-phase comparator CPv and a W-phase comparator CPw compare a V-phase node potential Vv and a W-phase node potential Vw with the middle potential Vcom of the Y connection middle terminal, and output a V-phase synchronous timing signal Vφ and a W-phase synchronous timing signal Wφ.

These synchronous timing signals Uφ, Vφ and Wφ are supplied as signals indicative of switching timings having the respective phases to a driving timing generating circuit 30.

Moreover, the synchronous timing signals Uφ, Vφ and Wφ are also supplied to a three-phase synthesizing circuit 24. The three-phase synthesizing circuit 24 synthesizes the synchronous timing signals Uφ, Vφ and Wφ and outputs a detected rotation number FD.

A controller 10 serves to control the control device according to the invention and is constituted by a microcomputer. The controller 10 comprises starting command output means 11 for outputting a starting signal ST, reverse rotation brake command output means 12 for outputting a reverse rotation brake signal Brb, rotation number setting means 13 for generating an operating rotation number FI, PWM-DUTY calculating means 14 for inputting the operating rotation number FI and the detected rotation number FD to calculate the duty of a pulse width modulation (PWM) control based on both of the inputs, which outputs a driving timing signal PWM, and SB rotation number setting means 15 for generating and outputting a short brake (SB) setting rotation number signal FS having a rotation number (for example, several tens to 100 RPM) which is much smaller than the operating rotation number FI (for example, 1000 to 2000 RPM).

When the starting signal ST is supplied from the controller 10 to a starting circuit 21, the starting circuit 21 forms a rectangular wave having a phase difference of 120 degrees during which period a high-state (H) level is set to be for only each period thereof, and supplies the rectangular wave to the driving timing generating circuit 30. The clock signal of an oscillating circuit 22 is supplied to the driving timing generating circuit 30 or other portions if necessary. In the case in which the clock signal is obtained from another device, for example, the controller 10, the oscillating circuit 22 can be omitted.

A frequency comparing circuit 23 digitally compares the detected rotation number FD with the SB setting rotation number signal FS, and generates a short brake signal Brs to be supplied to the driving timing generating circuit 30 when detecting that the detected rotation number FD which is larger than the SB setting rotation number signal FS becomes smaller than the SB setting rotation number signal FS. In addition, the reverse rotation brake signal Brb and the driving timing signal PWM are also supplied to the driving timing generating circuit 30.

With reference to FIGS. 2 and 3, similarly, description will be given to the operation of the control device of the sensorless motor according to the invention which has the structure described above.

When the starting signal ST is supplied from the starting command output means 11 of the controller 10 to the starting circuit 21, the starting circuit 21 forms a rectangular wave having a phase difference of 120 degrees during which period an H level is set to be for only each period thereof, and supplies the rectangular wave to the driving timing generating circuit 30. In the case in which the sensorless motor M is to be normally rotated, the rectangular waves set sequentially to be on the H level are generated in order of the U phase, the V phase and the W phase and a conducting logic signal is supplied to the inverters INVu to INVw through the driving timing generating circuit 30 and the transistor driving circuit 40. Consequently, a rotating magnetic field is formed in such a direction that the sensorless motor M is normally rotated, and the sensorless motor M is thus started to be normally rotated.

In a state in which the sensorless motor M is normally rotated, the node potentials Vu, Vv and Vw having the phases U, V and W and the middle potential Vcom are changed with a variation in a rotating position thereof as shown in FIG. 2.

Description will be given to an operation state for each of periods T1 to T6 obtained by dividing one cycle T0 (360 degrees) every 60 degrees.

For the period T1, the lower transistor Qud having the U phase and the upper transistor Qwu having the W phase are ON and the others are OFF, and a driving current flows from the W phase toward the U phase. At this time, the V phase is set in a non-feeding state. For the period T2, the upper transistor Qwu having the W phase and the lower transistor Qvd having the V phase are ON and the others are OFF, and the driving current flows from the W phase toward the V phase. At this time, the U phase is set in the non-feeding state. For the period T3, the upper transistor Quu having the U phase and the lower transistor Qvd having the V phase are ON and the others are OFF, and the driving current flows from the U phase toward the V phase. At this time, the W phase is set in the non-feeding state. Similarly, the processing subsequently proceeds to the periods T4, T5 and T6.

A pulse width is controlled in response to the driving timing signal PWM. Therefore, the upper transistors Quu to Qwu (or the lower transistors Qud to Qwd) are turned ON/OFF according to the pulse width for an ON period.

Referring to the periods T1 to T6 for the U phase, a power is fed in a negative direction for the periods T1 and T6 and is fed in a positive direction for the periods T3 and T4, and the non-feeding state is set for the periods T2 and T5. In the non-feeding state, the electric potential Vu of the U-phase terminal appears as an electric potential obtained by adding the middle voltage Vcom to an induced voltage applied by the U-phase driving winding. The middle potential Vcom fluctuates with a change in a rotating position (that is, a time) by the influence of the feeding voltages for the V and W phases which are fed at that time and the induced voltage.

The electric potential Vu of the U-phase terminal is compared with the middle potential Vcom by the U-phase comparator CPu. Then, the U-phase synchronous timing signal Uφ which is inverted on points ① and ② in which the comparison output of the U-phase comparator CPu is inverted is obtained so that an accurate U-phase switching timing is acquired. The same processing is carried out for the V phase and the W phase. Consequently, the rotating position of the sensorless motor to be bipolar driven is detected accurately.

The synchronous timing signals Uφ, Vφ and Wφ having the U, V and W phases thus obtained are supplied to the driving timing generating circuit 30, and the driving timing signals formed based on the synchronous timing signals Uφ, Vφ and Wφ are supplied to the transistor driving circuit 40.

Moreover, the detected rotation number FD formed from the synchronous timing signals Uφ, Vφ and Wφ by the three-phase synthesizing circuit 24 is compared with the operating rotation number FI by the PWM-DUTY calculating circuit 14, and the driving timing signal PWM regulated to cause the detected rotation number FD to be equal to the operating rotation number FI is also supplied to the transistor driving circuit 40 through the driving timing generating circuit 30.

In the transistor driving circuit 40, the inverters INVu to INVw are controlled by the conducting logic signals sent to the upper and lower transistors Quu to Qwd formed based on the driving timing signal PWM so that the sensorless motor M is driven at the operating rotation number FI in a positive direction.

With reference to FIG. 3, next, description will be given to an operation for stopping the sensorless motor M which is being rotated in the positive direction. In an operating state, the reverse rotation brake signal Brb (for example, the H level) is generated from the reverse rotation brake command output means 12 of the controller 10 and is supplied to the driving timing generating circuit 30.

The reverse rotation brake signal Brb is supplied to the driving timing generating circuit 30 so that the driving order of the U, V and W phases is the same as that in a normal driving operation and switching is carried out in such a manner that a feeding voltage level given to each phase is reverse to each other. More specifically, a positive voltage and a negative voltage are fed reversely.

Thus, a feeding voltage level to the sensorless motor M to be rotated in the positive direction is switched reversely. Consequently, the sensorless motor M is suddenly braked so that a rotating speed is reduced. Also in the braking, the feeding voltage level to the sensorless motor M is reversed so that the control operations of the inverters INVu to INVw are carried out in the same manner.

The electric potential Vu of the U-phase terminal, the electric potential Vv of the V-phase terminal and the electric potential Vw of the W-phase terminal, and the middle potential Vcom in the reverse braking are obtained as shown in FIG. 3. These electric potentials Vu, Vv and Vw and the middle potential Vcom are compared with each other by the U-phase comparator CPu, the V-phase comparator CPv and the W-phase comparator CPw, respectively. The U-phase synchronous timing signal Uφ, the V-phase synchronous timing signal Vφ and the W-phase synchronous timing signal Wφ to be comparison outputs are obtained so that accurate U-, V- and W-phase switching timings are acquired.

The power feeding phase to the sensorless motor M is also determined by the synchronous timing signals Uφ, Vφ and Wφ. By the reverse rotation braking driving operation, a strong brake is applied to the sensorless motor M. Consequently, the number of rotations is reduced rather promptly.

The synchronous timing signals Uφ, Vφ and Wφ required for applying the reverse rotation brake are obtained by the comparison of the induced voltage and the middle potential Vcom in the non-feeding state for each phase (in the example for the U phase in FIG. 3, ③ and ④ in the periods T2 and T5). Since the magnitude of the induced voltage is determined by a change in a magnetic flux across the driving winding, it is reduced when the rotating speed is decreased.

Also in the case in which the synchronous timing signals Uφ, Vφ and Wφ are obtained by the comparison of the induced voltage with the middle potential Vcom as in the invention, accordingly, the induced voltage is reduced when the number of rotations of the electric motor is decreased. Consequently, there is a possibility that the phase switching timing might be detected erroneously so that the switching might be carried out in an erroneous timing. Furthermore, a rotation might be carried out in a reverse direction by the inertia of the sensorless motor M so that unnecessary induced voltage is detected by the further generated reverse rotation whereby the electric motor might get out of a control.

In the invention, however, the detected rotation number FD is detected by the three-phase synthesizing circuit 24 based on the synchronous timing signals Uφ, Vφ and Wφ having three phases, and the detected rotation number FD is compared with the SB setting rotation number signal FS set by the SB rotation number setting means 15 through the frequency comparing circuit 23. When the detected rotation number FD is smaller than the SB setting rotation number signal FS, the short brake signal Brs is generated and is supplied to the driving timing generating circuit 30.

The driving timing generating circuit 30 receiving the short brake signal Brs applies a short brake to the inverters INVu to INVw by bringing all the three-phase driving windings of the sensorless motor M into a short-circuit state through the transistor driving circuit 40. For the short-circuiting method, all of the upper transistors Quu to Qwu are turned OFF and all of the lower transistors Qud to Qwd are turned ON. Alternatively, all of the upper transistors Quu to Qwu are turned ON and all of the lower transistors Qud to Qwd are turned OFF.

The SB setting rotation number signal FS applying the short brake is set to have a much smaller rotation number than a normal operating rotation number (approximately 1000 to 2000 RPM), for example, such a rotation number as to visually read the contents of the level of a CD (several tens to 100 RPM).

In this invention, the control device for driving the sensorless motor M having the three-phase driving winding is provided where the conducting logic signals in three phases with six modes are generated to the upper and lower transistors Quu to Qwd of the inverters INVu to INVw which are corresponding to the U, V and W phases by signals having three phases which have a phase difference of 120 degrees (electrical angle) from each other respectively. This control device comprises the first comparator CPu for comparing the node potential Vu of the upper and lower transistors Quu and Qud of the U-phase inverter INVu with the middle potential Vcom of the three-phase driving winding and for outputting the U-phase synchronous timing signal Uφ, the second comparator CPv for comparing the node potential Vv of the upper and lower transistors Qvu and Qvd of the V-phase inverter INVv with the middle potential Vcom of the three-phase driving winding and for outputting the V-phase synchronous timing signal Vφ, the third comparator CPw for comparing the node potential Vw of the upper and lower transistors Qwu and Qwd of the W-phase inverter INVw with the middle potential Vcom of the three-phase driving winding and for outputting the W-phase synchronous timing signal Wφ, the driving timing signal generating means 30 for inputting at least the driving timing signal PWM, the U-phase synchronous timing signal Uφ, the V-phase synchronous timing signal Vφ, the W-phase synchronous timing signal Wφ, the reverse rotation brake signal Brb and the short brake signal Brs and for outputting the three-phase driving timing signal, the transistor driving means 40 for inputting the three-phase driving timing signal and for applying the conducting logic signal to the upper and lower transistors Quu to Qwd of the inverters INVu to INVw having the U, V and W phases, and rotation number comparing means 23 for comparing the short brake setting rotation number signal FS with the detected rotation number FD detected based on the U-, V- and W-phase synchronous timing signals and for outputting the short brake signal Brs when the detected rotation number FD is smaller than the short brake setting rotation number signal FS. The upper and lower transistors Quu to Qwd of the inverters INVu to INVw having the U, V and W phases are controlled in such a manner that a reverse rotation brake is applied by the supply of the reverse rotation brake signal Brb, and then the upper and lower transistors of the inverters INVu to INVw having the U, V and W phases are controlled in such a manner that a short brake is applied by the supply of the short brake signal Brs.

In the invention, accordingly, when the sensorless motor M is to be stopped, braking is carried out by the reverse rotation brake till the range of the rotation number FS at which the polarity switching timing (that is, the synchronous timing signals Uφ, Vφ and Wφ) can be detected reliably from the induced voltage having each phase and the middle potential, and the braking is carried out by a short brake in a range lower than a rotation number at which the polarity switching timing might not be detected accurately. In the invention, therefore, the rotation of the sensorless motor can be stopped more promptly and accurately than those adopted in the conventional art.

By individually comparing the electric potentials Vu, Vv and Vw having the respective phases with the middle potential Vcom through the comparators CPu, CPv and CPw, moreover, it is possible to obtain the switching synchronous timing signals Uφ, Vφ and Wφ and to acquire the rotation frequency FD easily and accurately.

In the case in which the operating rotation number FI is greater than 2000 rotations, for example, the rotating speed is first reduced to approximately 1000 RPM (a first rotation number) by using the short brake when the electric motor is to be braked. During the short brake, the detected rotation number FD is not obtained. Therefore, the short brake is carried out for a predetermined period of time. Then, a deceleration is further performed to obtain a low speed (a second rotation number) of approximately several tens to 100 RPM by using the reverse rotation brake, and then, stop operation is carried out by using the short brake again.

When the rotation number of the electric motor is higher than the first rotation number, thus, the stop operation is carried out in the order of the short brake, the reverse rotation brake and the short brake so that the electric motor having a great rotation number can be stopped quickly and accurately without generating an abnormal voltage.

According to the control device of the electric motor according to the invention, the number of rotations and a rotating position are detected from an induced voltage also in braking and a reverse rotation brake is applied in an accurate phase, and furthermore, a short brake is applied at a set rotation number signal or less in the driving operation of the electric motor to be used in a disk apparatus. Differently from the conventional art, accordingly, there is no problem in that phase switching is carried out in an erroneous timing, a rotation is performed in a reverse direction by an inertia and the electric motor thus gets out of a control. Consequently, the rotation of the electric motor can be stopped quickly and accurately.

What is claimed is:

1. A control device of an electric motor for driving the electric motor having multi-phase windings in response to output signals having a predetermined phase difference from each other, comprising;

a plurality of comparing means for comparing a terminal potential of each of the multi-phase windings with a middle potential of the multi-phase windings, and driving timing signal generating means for generating a timing signal for outputting each of the output signals based on a result of the comparison carried out by each of the comparing means; and rotation number detecting means for detecting the number of rotations of the electric motor based on the result of the comparison obtained by the comparing means, wherein when the rotation of the electric motor is to be stopped, the driving timing signal generating means is controlled to apply a reverse rotation brake until the number of rotations of the electric motor is reduced to be a predetermined number of rotations by the rotation number detecting means, and the driving timing signal generating means is then controlled to apply a short brake until the rotation of the electric motor is stopped.

* * * * *